Patented July 15, 1924.

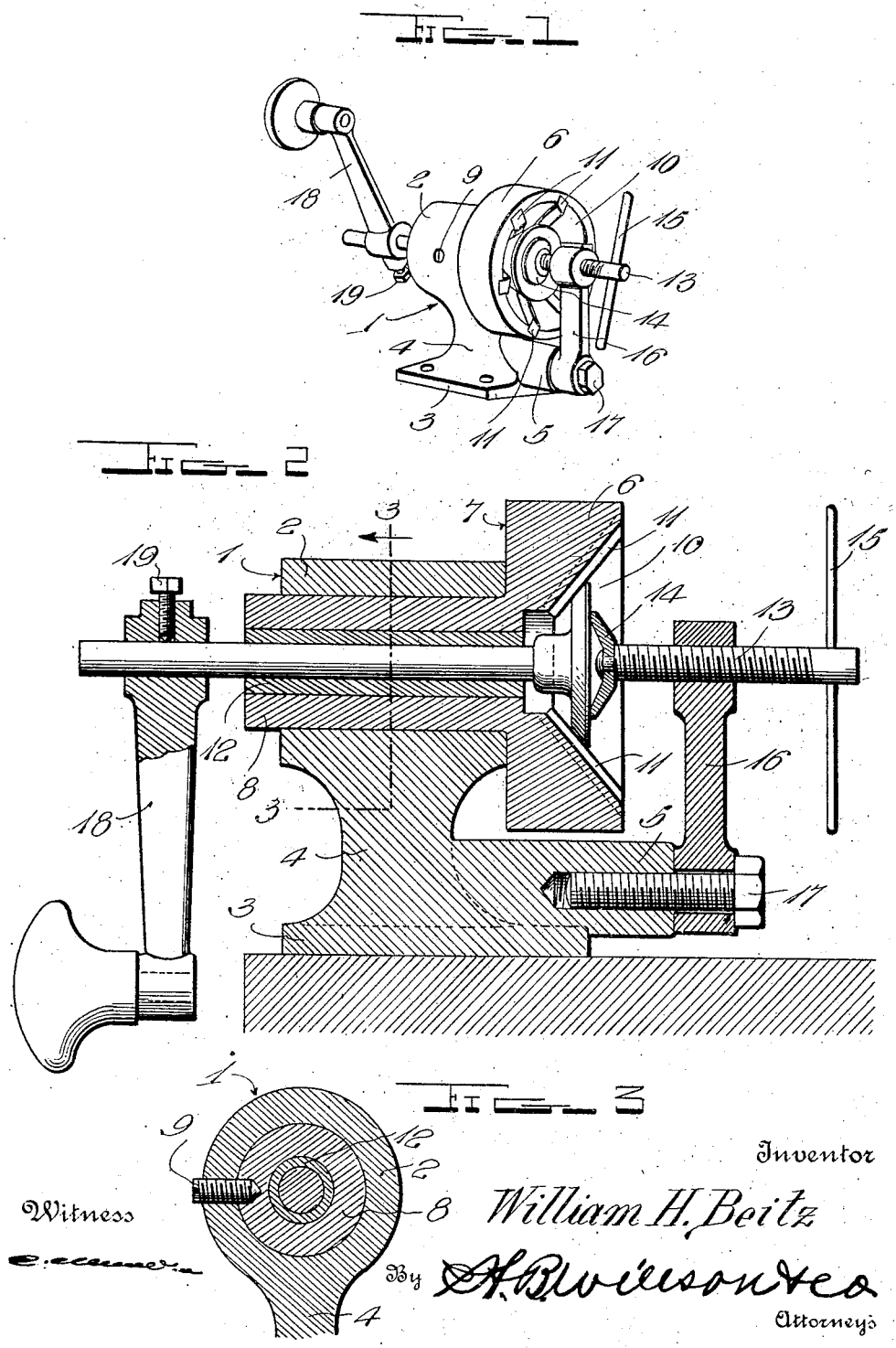

1,501,836

UNITED STATES PATENT OFFICE.

WILLIAM H. BEITZ, OF LOMIRA, WISCONSIN.

VALVE FACER.

Application filed January 18, 1923. Serial No. 613,469.

*To all whom it may concern:*

Be it know that I, WILLIAM H. BEITZ, a citizen of the United States, residing at Lomira, in the county of Dodge and State of Wisconsin, have invented certain new and useful Improvements in Valve Facers; and I do declare the following to be a full, clear, and exact description of the invention, such as will enable others skilled in the art to which it appertains to make and use the same.

My invention relates to tools for facing valves, such as those used upon gas engines, the object being to provide a device of this character which is of extreme simplicity and is therefore comparatively inexpensive, yet is highly efficient and durable, for use in connection with valves of different sizes.

With the foregoing in view, the invention resides in the novel subject matter hereinafter described and claimed, the description being supplemented by the accompanying drawing.

Figure 1 is a perspective view of a valve facing tool constructed in accordance with my invention.

Figure 2 is a vertical longitudinal sectional view.

Figure 3 is a detail transverse sectional view as indicated by line 3—3 of Fig. 2.

In the drawing above briefly described, the numeral 1 designates a one-piece body which is preferably in the form of a casting, said body comprising a horizontal cylindrical bearing 2, a base 3 below said bearing adapted for rigid mounting upon a work-bench or the like, a neck 4 integrally connecting the bearing 2 with the base 3, and a horizontal arm 5 extending forwardly from the neck 4 with its lower side integral with the base 3, said arm being parallel with the axis of the bearing 2.

The numeral 6 designates a cylindrical cutter head having a flat rear end 7 provided with a central rearwardly extending bearing stub 8 of tubular form, said stub being received snugly in the bearing 2 and being removably held in this bearing by a set screw 9. The front end of the cutter head 6 is formed with a substantially conical recess 10 and is provided with suitable cutters 11 at the wall of said recess for facing a valve said cutters being preferably removable in order that they may be readily sharpened. For guiding the valve stem while the valve is being faced, I furnish a plurality of bushings with the tool, any one of which may be received snugly yet removably in the bearing stud 8, as indicated at 12 in Figs. 2 and 3 and for the purpose of tightly holding the valve against the cutters 11 and feeding it as required, I make use of a suitable screw 13 whose valve-engaging end is preferably provided with a swiveled foot 14 while its front end is equipped with an appropriate handle 15. The screw 13 is threaded through the upper end of a substantially upright arm 16 which contacts with the flat front end of the horizontal arm 5 above described, said arm 16 being connected with said arm 5 by a clamping screw 17 which passes loosely through the former and is threaded into the latter. By tightening this screw, the arm 16 may be rigidly held in upright position for use but when the screw is loosened, said arm 16 may be swung downwardly after first backing out the screw 13 to a sufficient extent, thus permitting the valve to be readily removed. It will also be understood that when inserting the valve, the arm 16 is in a lowered position.

For the purpose of rotating the valve against the cutters 11, any suitable means may be employed, but I prefer to make use of a hand crank 18 having a set-screw 19 by means of which it may be secured to the valve stem.

In actual use, the invention has proven very efficient and desirable and I therefore prefer to follow the details of construction which have been disclosed. However, within the scope of the invention as claimed, changes in form, proportion and minor details may well be made.

I claim:

A valve facing tool comprising a substantially cylindrical body having a longitudinally extending horizontally disposed passage, said body being provided wth a depending neck terminating in a flared support-engaging base adapted to be firmly secured upon a support, an arm extending from the depending neck and merging into said base and extending beyond the forward end of the base and having its forward end portion provided with a longitudinally extending threaded socket extending parallel to the axis of the passage in said body, an enlarged cutter head fitting against the forward end of said body and having a hollow shank extending through the passage in said body and held against rotation therein, said head having a conical pocket leading from its forward end, a bushing removably fitting in the hollow shank for rotatably receiving the stem of a valve having its head positioned in the conical recess of said head, radially disposed cutting blades removably fitting in grooves formed in the walls of said recess for trimming the seat-engaging face of said valve head when the valve is rotated through the medium of a turning device removably connected with the valve stem beyond the rear end of said shank and bushing, an arm having an opening registering with the threaded socket, a fastener bolt passing through the opening in said arm and screwed into said threaded socket to mount the arm for swinging movement, the swinging arm being provided in its free end portion with a threaded opening for axial alinement with said bushing when in place, a pressure screw in the threaded opening of said arm, and a foot for engaging the valve head swiveled upon the end of said pressure screw.

In testimony whereof I have hereunto affixed my signature.

WILLIAM H. BEITZ.